(12) United States Patent
Tzeng et al.

(10) Patent No.: US 7,146,105 B1
(45) Date of Patent: Dec. 5, 2006

(54) MEMS-BASED OPTICAL WIRELESS COMMUNICATION SYSTEM

(76) Inventors: Paul Tzeng, 9 Cuching, Suite 100, Irvine, CA (US) 92618; Randall J. Blair, 9 Cushing, Suite 100, Irvine, CA (US) 92618

( * ) Notice: Subject to any disclaimer, the term of this patent is extended or adjusted under 35 U.S.C. 154(b) by 664 days.

(21) Appl. No.: 10/411,559

(22) Filed: Apr. 10, 2003

Related U.S. Application Data

(60) Provisional application No. 60/372,046, filed on Apr. 12, 2002.

(51) Int. Cl.
*H04B 10/00* (2006.01)
(52) U.S. Cl. ............. 398/128; 398/118; 398/121; 398/130; 398/135; 398/138
(58) Field of Classification Search ........... 398/118, 398/128, 130, 135, 138, 121
See application file for complete search history.

(56) References Cited

U.S. PATENT DOCUMENTS

2002/0126340 A1* 9/2002 Nikiforov et al. ........ 359/113

* cited by examiner

*Primary Examiner*—M. R. Sedighian
(74) *Attorney, Agent, or Firm*—Albert O. Cota

(57) ABSTRACT

A MEMS-based optical, wireless communication system (10) that is comprised of a receiving and transmitting optical unit (12) that is further comprised of a transmitting subsystem (14) and a receiving subsystem (60), both of which are controlled by a microcontroller (16) and firmware (96). The system (10) is designed to allow a first unit (12) to transmit through free space a modulated laser beam (39) that is received by a second unit (12) located within line-of-sight of the first unit (12). Conversely, the second unit (12) can likewise transmit a modulated laser beam (39) that is received by the first unit (12) or other line-of-sight units (12). The system (10) features a MEMS mirror assembly (34) that operates in combination with a quad sensor (100). The combination allows fast, precise tracking and compensates for atmospheric disturbances associated with optical communication namely, building sway, wind and scintillations caused by changes in the refraction index of the atmosphere.

19 Claims, 4 Drawing Sheets

MEMS-BASED OPTICAL WIRELESS COMMUNICATION SYSTEM

This application claims the benefit of Provisional Application No. 60/372,046 filed Apr. 12, 2002.

TECHNICAL FIELD

The invention pertains to the general field of free space optical communication systems and more particularly to an optical, wireless communication system that incorporates a MEMS mirror. The MEMS mirror compensates for mechanical movement and atmospheric aberrations to provide a stable optical transmission and receiving system.

BACKGROUND ART

With the explosive growth of information services related to the "world wide web" in the last decade and the increasing demand for high resolution color graphic art and video in the material being presented therein, a demand for high data rate interconnects which are rapidly deployable, flexible and of minimum cost has been generated. With the high costs peripheral to the process of deploying fiber optics to satisfy this demand and the lack of flexibility in networks using fiber optics or other physically fixed installation, "Free Space Optical" (FSO) point to point data links have emerged which can fit these requirements. However, one significant drawback with FSO transceivers which has resulted in higher than expected cost and has forced units to be large and cumbersome is that once the transmit optical beams of the units have been aimed at the opposing receivers, motion in the platform supporting either unit or the influence of atmospheric air currents can be large enough to move either beam off the respective receiver aperture and thereby momentarily sever the data link. Another drawback is that to attain high-speed operation, the physical diameter of photosensitive receivers must be a fraction of a millimeter, thus leading to limitations on the Field of View (FOV) for the optical receiver systems. As with movement of the beam, the motion of the platform supporting the unit can be enough to move the image of the transmitter of the opposing unit outside the FOV of the receiver, again severing the optical link. This occurs even if the beam from the opposing unit remains on the receiver aperture.

A growing number of manufacturers have attempted to solve these difficulties by making the optical beams movable in order to track the motion of the opposite units. However, moving the beam along does nothing to resolve the problem of support motion moving the received beam outside the FOV of the receiver. A very few manufacturers have attempted to solve this latter problem by using a movable mirror to reflect both the outgoing beam to the opposing receiver and reflect the incoming beam into the receiver FOV. Herein lies a design problem related to the time scales of the motions introduced by a building, the support structure which attaches the unit to the building and the movement due to atmospheric currents which limits the ability to use the aforementioned beam steering approach. Overall movement of the building is driven by thermal expansion and the forces due to wind averaged over the building's mechanical resonance frequencies. As a result, these motions cause changes over many minutes or hours. The motion of the unit mount itself is due primarily to mechanical vibration in the building's structure proximal to the location of the mount and the forces on the unit due to wind averaged over the mechanical resonance frequencies of the mount. The resonance frequencies of the unit and its mount tend to be a small fraction of a Hertz up to a few Hertz, corresponding to a fraction of second to a small number of seconds; so the motions driven by wind tend to be of the same order in time. As most vibration sources, pumps and air handlers, are driven by alternating electrical current at 60 Hz, the motions from these sources tend to produce motions at fractions from 60 Hz to two or three times 60 Hz, corresponding to a fraction of a second in time down to many milliseconds. The influence of atmospheric air currents on an optical beam is fairly complicated and depends on momentary fluctuations in air temperature and speed but typically causes movement of the beam position on time scales similar to that outlined above for vibration.

The difficulty that these motion time scales produce is that the maximum speed of movement of the mirror, and hence the motions that can be compensated for, is limited by the mechanical resonance frequency of the mirror and its movement mechanism which is related to the physical size and mass of the mirror. A mirror fast enough to compensate for mount vibration and atmospheric air movement is typically a few millimeters diameter or less, which is much smaller than is practical for the minimum beam diameters attainable at typical link distances of a few hundred meters, and hence for practical receiver apertures. However, mirrors large enough to reflect the whole receiver FOV into the receiver aperture tend to be many centimeters diameter and to have mechanical resonance frequencies near or well below one Hertz. Thus, these mirror systems cannot compensate for mount vibration or atmospheric influences. Therefore, the receiver aperture must be made larger and the beam made larger to compensate for the further reduced speed of the tracking system. The result is that these systems can typically only compensate for overall building movement.

A further difficulty with implementing a motion tracking system is sensing the beam motion with sufficient precision at the opposing receiver in the presence of more intense light sources in the wavelength region of the laser transmitter, such as the sun. One implementation of a beam position sensor is to project part of the received beam onto a photosensitive detector with multiple segments. However, due to the relatively small size of these type of detectors relative to the typical receiver aperture diameter, a focusing lens or reducing telescope is needed to relay the sample of the received beam, which makes the sensing system fundamentally insensitive to the beam position. Instead, such a system senses the angle of arrival associated with the beam deflection which can be quite small, and the influence of atmospheric air currents can momentarily cause the beam to appear to emanate from a different angle than that joining the receiver and transmitter. An additional difficult with this system is that sunlight can enter the receiver aperture at an angle near the angle joining the units and fall unevenly on the segmented "position" sensor, thus causing the sensor signal to erroneously represent the beam source angle to be different from that of the transmitted beam. The size of the segments tend to be large enough that the response speed is much slower than the pulses representing the modulated transmit beam, so there is no possibility of distinguishing the signal due to light from the beam or from the sun, despite wavelength selective filtering.

These difficulties can be alleviated by using multiple individual sensors located above the periphery of the data receiver aperture for positioning sensing. The benefit of using individual sensor is that each sensor can be made with an FOV large enough that they are insensitive to the angle of arrival of the beam and therefore are able to sense the beam signal at distinct points in space. From this information, an approximate beam center position can be computed with potentially higher precision than that inferred from the angle of arrival. The individual sensors can be made small enough that they can respond to the pulses representing the modulated transit beam, thereby allowing electrical means to counter the sensitivity to sunlight or other sources in the wavelength region.

A search of the prior art did not disclose any patents that read directly on the claims of the instant invention, however the following U.S. patents are considered related:

| U.S. Pat. No. | INVENTOR | ISSUED |
| --- | --- | --- |
| 6,335,811 | Sakanaka | 1 Jan. 2002 |
| 5,867,294 | Sakai | 2 Feb. 1999 |
| 5,748,813 | Cassidy, et al | 5 May 1998 |

The 6,335,811 patent discloses an optical space communication apparatus. The apparatus includes a first electrical signal that is converted into a first optical signal, and the first optical signal is transmitted to a partner apparatus in the form of a first light beam. A second light beam transmitted from the partner apparatus is received to thereby detect a second optical signal by a photodetector of the apparatus. The second optical signal is converted into a second electrical signal. A transmission direction of the first light beam and the reception direction of the second light beam are changed in a direction to maximize the intensity of the second electrical signal obtained by converting the second optical signal detected by the photodetector.

The 5,867,294 patent discloses an optical space communication apparatus includes a transmission device for transmitting a first optical beam and a receiving device for receiving a second optical beam. A deflecting device is included for detecting the first and second optical beam.

The 5,748,813 patent discloses an optical communication system for free space communication. The system includes an optical source including a modulator to modulate the optical output to provide an optical signal. The optical source is connected to an optical fiber to pass the signal. The optical fiber includes an antenna having an optical fiber transmit portion with a core and a cladding. The cladding includes at least one substantially flat surface extending along its length and is arranged to couple light out of the optical fiber through the substantially flat surface(s).

For background purposes and as indicative of the art to which the invention is related reference may be made to the remaining cited patents.

| U.S. Pat. No. | INVENTOR | ISSUED |
| --- | --- | --- |
| 6,259,544 | Dishman, et al | 10 Jul. 2001 |
| 6,246,498 | Dishman, et al | 12 Jun. 2001 |
| 6,181,450 | Dishman, et al | 30 Jan. 2001 |

DISCLOSURE OF THE INVENTION

The MEMS-based optical, wireless communication system (MBOWCS) disclosed herein allows optical and wireless communication between a first receiving and transmitting optical unit that is optically linked with a second receiving and transmitting optical unit to form an optical, wireless communication link.

The MBOWCS in its basic design is comprised of:
A. the first receiving and transmitting optical unit having means for receiving and processing an input data signal and producing a modulated laser beam that is transmitted through free space, and
B. the second receiving and transmitting optical unit located at a distance but within line-of-sight of the first unit. The second unit having means for receiving and processing the modulated laser beam applied from the first unit. The second unit also has means for producing a modulated laser beam that is transmitted through free space and received and processed by the first unit. Thus, creating a bi-directional communication system.

The receiving and transmitting optical unit is comprised of a transmitting subsystem and a receiving subsystem both of which are controlled by a microcontroller that is operated by a firmware program. The transmitting subsystem is comprised sequentially of a laser driver, a laser diode, a collimator, a MEMS mirror assembly and a transmitting telescope. The receiving subsystem is comprised sequentially of a receiving telescope, optically a MEMS mirror; a narrow-band filter; a photodiode; and an amplifier.

The operation of the MBOWCS is summarized as follows: During the transmitting phase, data for control of the MEMS mirror assembly on the second receiving and transmitting optical unit is computed by the microcontroller, which in turn mixes this data with the input data stream to produce an output data signal. The output data signal is applied through the laser driver to the laser diode where a modulated laser beam is produced. The modulated laser beam is applied to the collimator wherefrom a collimated laser beam is produced. The collimated beam is applied to the MEMS mirror assembly, where the beam is reflected prior to being applied to the transmitting telescope.

The spacing of the mirror from the input lens allows the expanded output beam to be moved. From the transmitting telescope a modulated laser beam is produced that is sent into free space. The modulated laser beam being transmitted into free space is captured by the receiving telescope which is located within line-of-sight of the transmitting telescope. The receiving telescope reflects the beam from the MEMS to steer the receiver field of regard to point toward the transmitter and directs the modulated laser beam through the narrow-band filter to produce a filtered laser beam that is applied to the photodiode. The output of the photodiode is an electrical signal that is subsequently amplified by the amplifier prior to being applied to the microcontroller for processing.

In further summary, the MEMS-based optical, wireless communication system is comprised of two transceivers each containing a transmitting subsystem capable of modulating a light beam to carry data to be transmitted to the opposing receiving unit. A receiving subsystem us utilized to translate the modulated light beam signal from the opposing unit's transmitter back into data and determine the position of the opposing unit's beam relative to its receiver aperture. A data processing unit controls the movement of the MEMS mirror; performs calculations needed to implement all control functions, including the tracking system; and mixes the control data information needed by the opposing unit to control its mirror with the externally supplied data stream transmission to the opposing unit. The transmitting subsystem is comprised sequentially of a light source driver, a light source, a light intensity modulator, a collimating lens assembly, the MEMS mirror assembly and a multi-lens telescope assembly. The first lens of the telescope is spaced from the MEMS mirror to allow movement of the output beam by moving the MEMS mirror. The receiving subsystem is comprised sequentially of: a receiving telescope, sensors to sense the position of the beam relative to the receiver aperture, optionally a MEMS mirror assembly, spectrally and spatially selective light filters, a photosensitive element and electronics to reconstruct the transmitted data. The second lens of the beam telescope is spaced from the MEMS mirror to allow movement of the field of regard of the receiver by moving the MEMS mirror. The control subsystem includes electronics to process the signals from the beam positioning sensors and calculate beam position data, to mix the control data with the externally supplied data for transmission to the opposing unit as well as separate the control data from the opposing unit from the externally supplied data, to sense environmental conditions such as temperature and humidity and to drive heaters or electronic coolers to maintain the internal environment and surfaces of optics free of condensation. The electronics also drive and control the MEMS mirror(s) for motion tracing, for reporting the unit's operational status and for routing external data to back-up data transmission hardware in case of unit transmission failure.

In view of the above disclosure the primary object of the invention is to produce a MEMS-based optical, wireless communication system that can provide an effective and reliable optical communication link between at least two line-of-sight systems.

In addition to the primary object of the invention it is also an object of the invention to provide a MEMS-based optical, wireless communication system that:

is reliable and relatively maintenance free,
provides a large field-of-vision,
is compact and easily assembled,
is easy to operate,
allows the transmitting telescope to be easily aligned with the receiving telescope,
is designed to compensate for atmospheric and physical disturbances that typically hinder optical communication systems, and
is cost effective from both a consumer and manufacturer points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 also shows an optional display system connected to a microcontroller.

BEST MODE FOR CARRYING OUT THE INVENTION

The best mode for carrying out the invention is presented in terms of a preferred embodiment for a Micro Electromechanical System (MEMS)-Based, Optical, Wireless Communication System 10, (hereinafter "MBOWCS 10"). The MBOWCS 10, as shown in FIGS. 1–6, is designed to provide optical, wireless communication between two or more locations by utilizing the MBOWCS 10 in combination with data inputs provided by existing telecommunication equipment.

Figure 1:
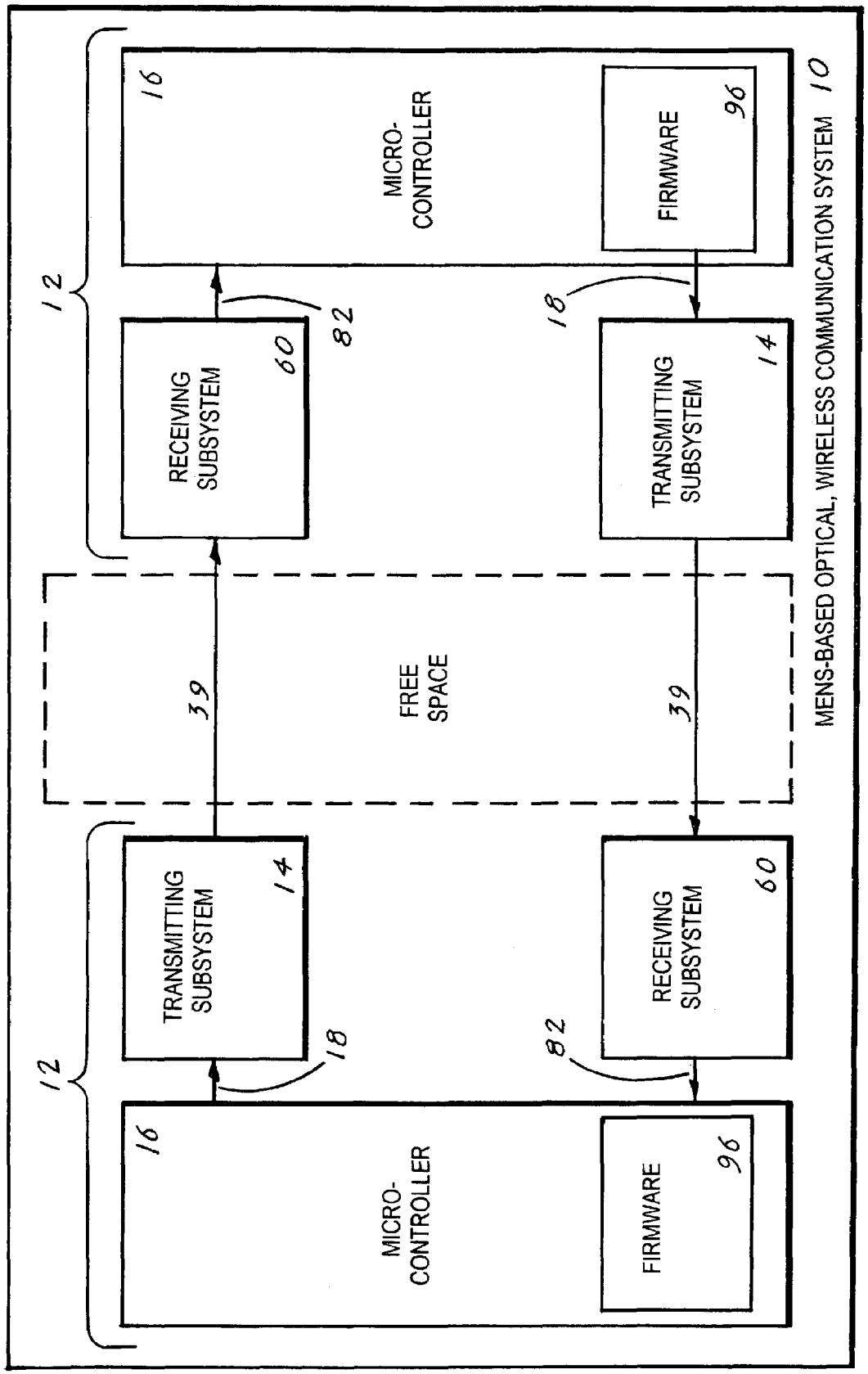
FIG. 1 is a block diagram showing a MEMS-based optical, wireless communication system consisting of a first receiving and transmitting optical unit processing data to and from at least one additional receiving and transmitting optical unit.

The MBOWCS 10, as shown in FIG. 1, consists of at least two receiving and transmitting optical units 12. Each unit 12 is comprised of a transmitting subsystem 14, a receiving subsystem 60, and a microcontroller 16 that is operated by a firmware program 96.

The transmitting subsystem 14 has means for receiving an input data signal 17 and transmitting a corresponding modulated laser beam 39 through free space. The receiving subsystem 60 has means for receiving the modulated laser beam 39 from the transmitting subsystem 14, sensing the beam's position, and producing an amplified electrical signal 82 that is applied to the microcontroller 16 for processing.

FIG. 1 also illustrates a first receiving and transmitting optical unit 12, which is shown on the left side, and a second receiving and transmitting optical unit 12, which is shown on the right side and that is within line-of-sight of the first unit 12. The first unit 12 is depicted transmitting, via the transmitting subsystem 14, the modulated laser beam 39 that is received by the receiving subsystem 60 on the second unit 12. Conversely, the second unit 12 can also be enabled to transmit a second modulated laser beam 39 via the transmitting subsystem 14. The second beam 39 is then received by the receiving subsystem 60 on the first unit 12. Likewise, several receiving and transmitting optical units 12 can be located within line-of-sight of each other to provide a composite optical communication link.

The details of the transmitting subsystem 14, the receiving subsystem 60 and the microcontroller 16 are described with reference to FIG. 2.

The microcontroller 16, which is operated by firmware 96, can be preferably comprised of a PIC microcontroller and includes means for receiving and processing the input data signal 17 and producing an output data signal 18. The input data signal 17 can consist of a digital signal that is derived from an ethernet network, a video signal or an audio signal.

The transmitting subsystem 14 is comprised of five elements: a laser driver 20, a laser diode 24, a collimator 28, a MEMS mirror assembly 34 and a transmitting telescope 48.

The laser driver 20 is comprised of a variable electrical energy source and includes means for receiving and processing the output data signal 18 and producing a modulated laser signal 22.

The laser diode 24 includes means for being energized by the modulated laser signal 22 and producing a modulated laser beam 26. Typically, the laser diode 24 operates at an emitting frequency between 780 nm and 1550 nm and has an average output power ranging from less than one mw to several hundred mw.

The collimator 28 is comprised of a first lens 30 and an axially-aligned second lens 32. The two lenses can be positioned to collimate the modulated laser beam from 7 to 22 degrees, to substantially a one milliradian divergence angle. The collimator 28 includes means for receiving and filtering the modulated laser beam 26 applied from the laser diode 24. The output of the collimator 28 is a collimated laser beam 27 of adjustable divergence that has an area that is smaller than the area of the MEMS mirror 36.

Figure 3:
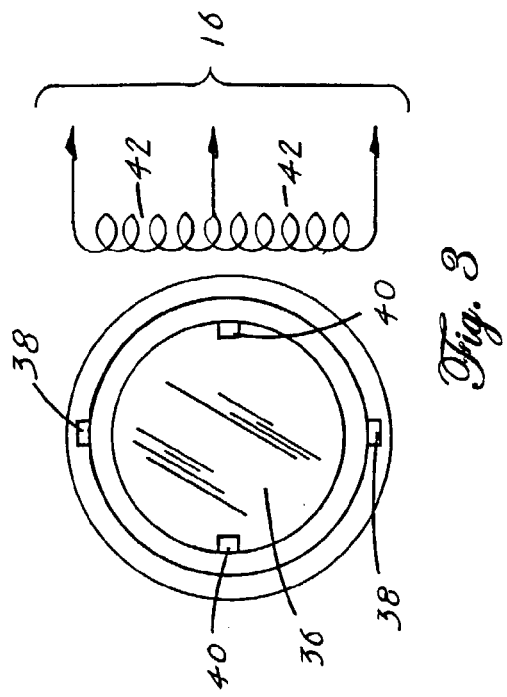
FIG. 3 illustrates a MEMS mirror assembly that includes a MEMS mirror, a first and second pair of permanent magnets and a pair of electrical coils.

The MEMS mirror assembly 34 includes means for reflecting and positioning the laser beam 27 prior to being applied to the transmitting telescope 48. The collimated output of the assembly 34 is a modulated laser beam 35. As shown in FIG. 3, the MEMS mirror assembly 34 is comprised of:

A. A MEMS mirror 36 that is preferably produced on a single silicon crystal and that can operate at a very high frequency with great precision, B. A first pair of permanent magnets 38 that are vertically-aligned with respect to the MEMS mirror 36, C. A second pair of permanent magnets 40 that are horizontally-aligned with respect to the MEMS mirror 36, and D. A pair of electrical coils 42 that are connected to a power source 44. The current produced by the coils 42 interacts with the magnetic fields produced by the magnets 38,40 to allow the MEMS mirror 36 to tilt along two orthogonal axes. Each axis has a deflecting angle of ±5 degrees.

The MEMS mirror assembly 34 which is capable of a ±5-degree angular movement within a 5-millisecond time period is designed to operate with a quad sensor (described infra) to compensate for atmospheric disturbances associated with optical communication. The disturbances include building sway, wind, and scintillations caused by changes in the refraction index of the atmosphere.

The final element of the transmitting subsystem 14 is the transmitting telescope 48 which includes means for receiving the modulated laser beam 35 that is applied form the MEMS mirror assembly 34. The output of the telescope 48 is a steerable, modulated laser beam 39 that is transmitted through free space. Preferably, the telescope 48 is comprised of a larger first lens 50 and a smaller second lens 52. The two lenses 50,52 operate in combination to further collimate the modulated laser beam 39 by increasing the beam diameter and the second lens 52 is located its focal distance from by the MEMS mirror assembly. The divergence angle of the modulated laser beam 39 can be further reduced by selecting the ratio of the focal length of the first and second lenses 50,52.

The modulated laser beam 39 from the transmitting telescope 48 is applied to the receiving system 60 which is also comprised of five elements: a receiving telescope 62 or a focusing lens, optionally a MEMS mirror; a narrow band filter 70; a photodiode 76; an amplifier 80; and quad sensors 100.

Figure 4:
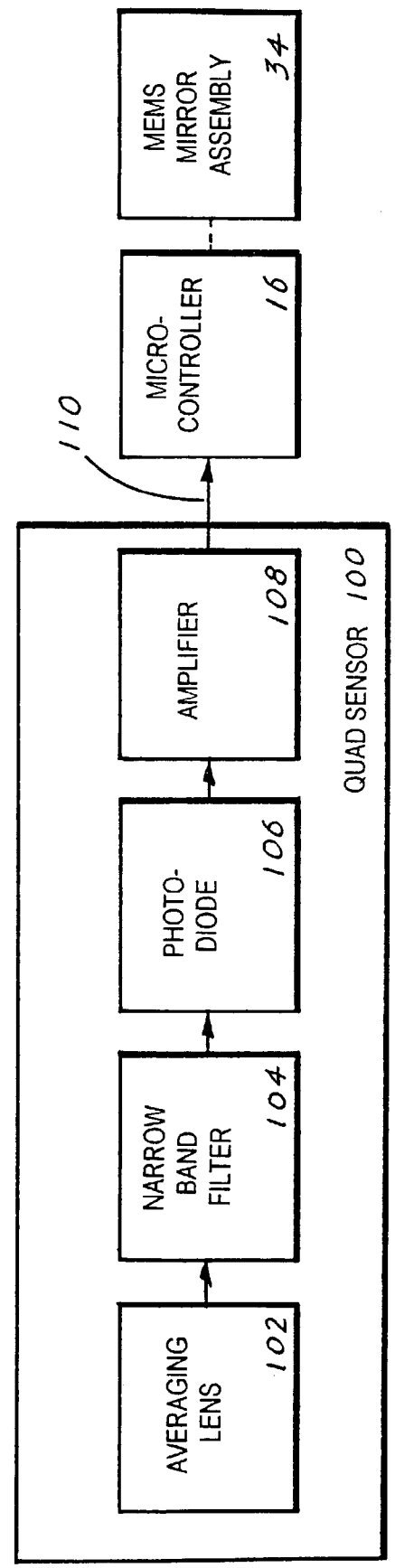
FIG. 4 is a block diagram of the elements that comprise a quad sensor.
Figure 5:
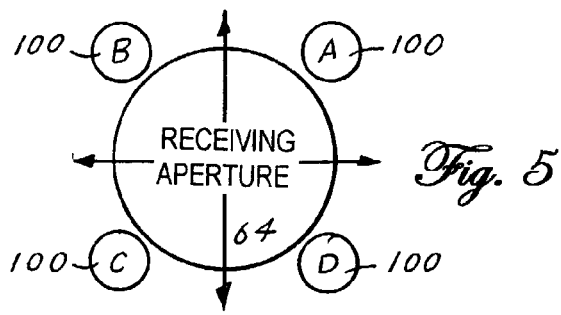
FIG. 5 illustrates four quad sensors evenly placed around the circumference of the aperture of a receiving telescope which is an element of the receiving subsystem.

The receiving telescope 62 is positioned within line-of-sight of the transmitting telescope 48 and includes means for receiving the modulated laser beam 39 transmitted from the transmitting telescope 48. The output of the receiving telescope 62 is a focused laser beam 41, which passes through a narrow band pass filter 66 to a photodiode 76, as shown in FIG. 2. The photodiode 76 includes means for receiving the focused and filtered laser beam 72 and producing an electrical signal 78. The signal 78 is then applied to the amplifier 80 which produces an amplified signal 82 that is applied to the microcontroller 16 for further processing. Optionally, the output of the receiving telescope 62 is a narrow collimated beam of small enough width to reflect from the MEMS mirror through a narrow-band filter 70 to the photodiode 76 with electronics as described above. Part of the output of the receiving telescope 62 and MEMS mirror is sampled optically and sent to a position sensitive detector (PSD) which, with amplifier electronics, generates signals 110, as shown in FIG. 4, to allow determination of the position of the image of the incoming beam 39 within the receiver field of view. By means of the signals 110, the microcontroller 16 can move the output of the receiving telescope beam via the MEMS mirror to the center of the photodiode 76 to compensate for movement and atmospheric disturbances. As with the transmitting telescope, the second lens of the receiving telescope is spaced by its focal length from the MEMS mirror to allow for changes in the mirror angle to change the field of regard of the receiver system.

The quad sensor 100, as shown in FIG. 4, is comprised of at least four individual sensors, with each sensor evenly spaced around the receiving aperture 64 as shown in FIG. 3. Each sensor 100, as shown in FIG. 4 is comprised sequentially of an averaging lens 102, a narrow band filter 104, a photodiode 106 and an amplifier 108. The output of the amplifier 108 is a signal 110 that is applied to the microcontroller 16 which, in turn, operates the MEMS mirror assembly 34. In other words, each sensor has one or more lenses to focus the intercepted part of the transmitted beam through a spectrally selective filter onto a nominally small photosensitive detector. This detector is rendered insensitive to ambient light by an electrical means comprising either capacitively coupling the detector current to the input amplifier or capacitively coupling the output of the input amplifier to an RMS reading amplifier which detects only the time-varying modulated light. Optionally, this amplifier has a logarithmic input/output dependence to provide an input power dependent signal which covers a large dynamic range.

Figure 2:
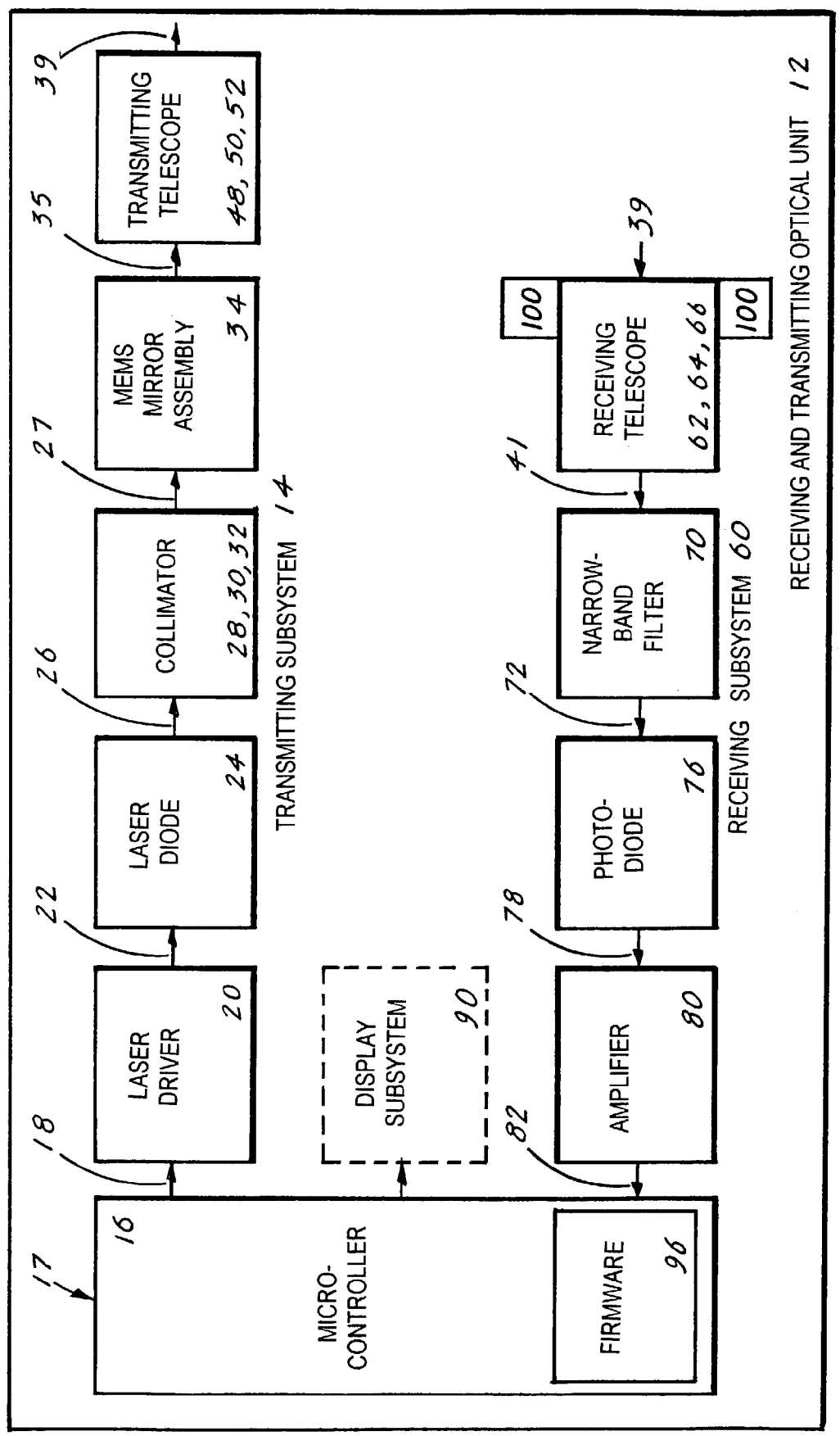
FIG. 2 is a block diagram showing the elements that comprise the transmitting subsystem and the receiving subsystem.

As shown in FIG. 2, the receiving and transmitting unit 12 can be designed to include a display subsystem 90. The display, which is controlled and operated by the microcontroller 16, allows various incoming and outgoing data to be displayed. Additionally, the system 10 can be designed with a transmitting telescope 48 and a receiving telescope 60 that are integrated into a dual composite telescope (not shown). The composite telescope is capable of both transmitting and receiving data signals.

Figure 6:
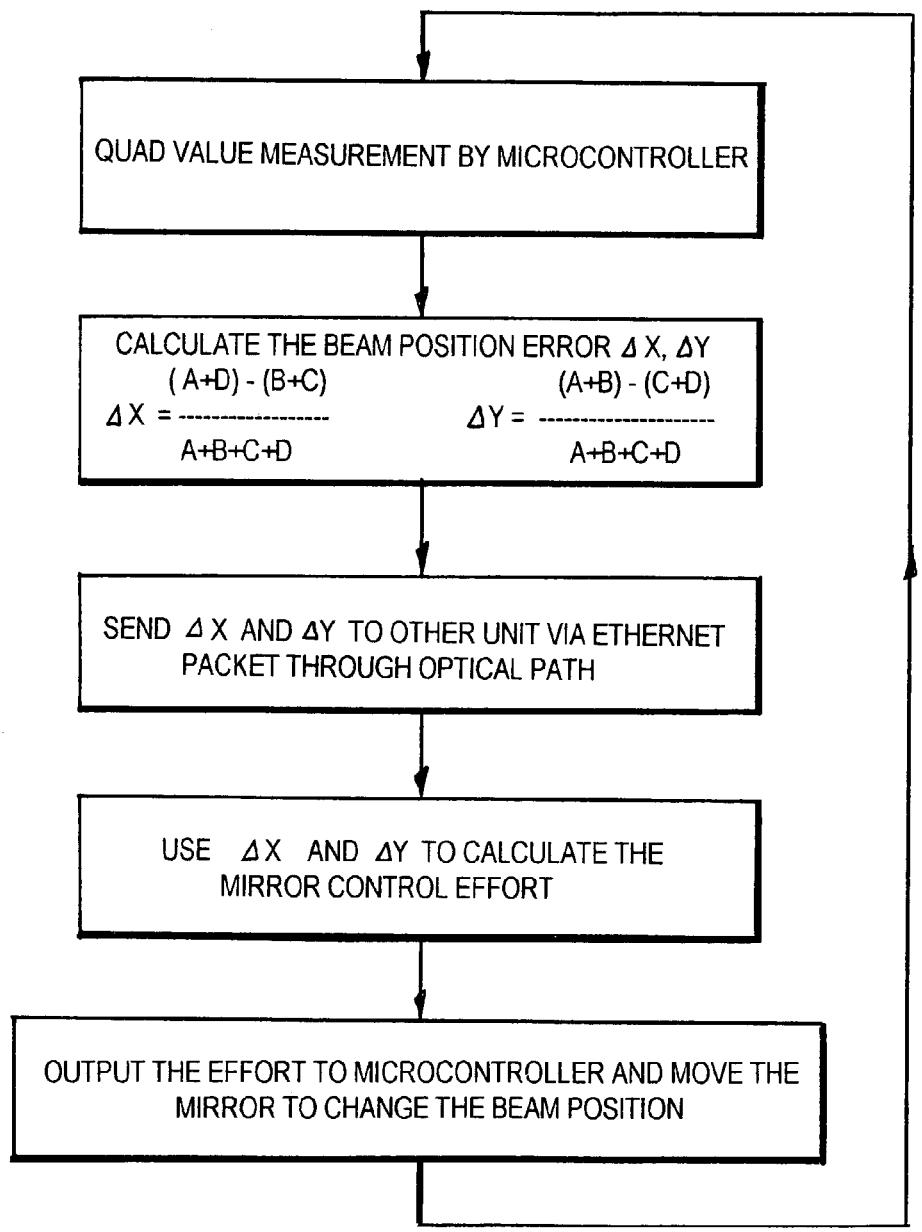
FIG. 6 is an illustration of a typical quad sensor processing algorithm.

The final element that comprises the MBOWCS 10 is the quad sensor processing algorithm, as shown in FIG. 6.

While the invention has been described in complete detail and pictorially shown in the accompanying drawings, it is not to be limited to such details, since many changes and modifications may be made in the invention without departing form the spirit and scope thereof. Hence, it is described to cover any and all modifications and forms which may come within the language and scope of the appended claims.

The invention claimed is:

1. A MEMS-based optical, wireless communication system comprising:

A. a first receiving and transmitting optical unit having means for receiving and processing an input data signal and producing a modulated laser beam that is transmitted through free space, and B. a second receiving and transmitting optical unit located at a distance but within line-of-sight from said first unit, wherein said second unit having means for receiving and processing the first modulated laser beam applied from said first unit, wherein said second unit also having means for producing a second modulated laser beam that is transmitted through free space and received and processed by said first unit, thus creating a bi-directional communication system, wherein said first and second receiving and transmitting optical units further comprise:

a) a transmitting subsystem comprising:
  (1) a microcontroller having means for receiving and processing the input data signal and producing an electrical output data signal,
  (2) a laser driver having means for receiving and processing the output data signal and producing a modulated laser signal,
  (3) a laser diode having means for being energized by the modulated laser signal and producing a modulated laser beam,
  (4) an adjustable collimator having means for receiving the modulated laser beam and producing a collimated laser beam of adjustable divergence,
  (5) a MEMS mirror assembly having means for reflecting and positioning the collimated laser beam, and
  (6) a transmitting telescope having means for receiving the modulated laser beam and producing a steerable modulated laser beam that is transmitted through free space, and
(b) a receiving subsystem comprising:
  (1) a receiving telescope that is positioned within line-of-sight of said transmitting telescope having a steerable field of regard and, said receiving telescope having means for receiving the modulated laser beam transmitted from said transmitting telescope and producing a focused laser beam,
  (2) a narrow-band filter having means for receiving and passing only the focused laser beam, and producing a focused and filtered laser beam,
  (3) a photodiode having means for receiving the focused and filtered laser beam and producing an electrical signal, and
  (4) an amplifier having means for receiving the electrical signal from said photodiode and producing an amplified signal that is applied to said microcontroller for further processing.

2. The system as specified in claim 1 wherein said second receiving and transmitting optical unit is comprised of at least one unit.

3. The system as specified in claim 2 wherein the data for control of said MEMS mirror assembly on said second receiving and transmitting optical unit is mixed with the input data stream and separated from the original input data by said second receiving and transmitting optical unit.

4. The system as specified in claim 1 wherein said laser driver is comprised of a variable electrical energy source.

5. The system as specified in claim 1 wherein said laser diode operates at an emitting frequency between 780 nm and 1550 nm, and has an average output power ranging between one mw to several hundred mw.

6. The system as specified in claim 1 wherein said collimator is comprised of a first lens and an axially-aligned second lens, wherein said lenses can be positioned to collimate the modulated laser beam from 7 to 22 degrees, to substantially a one milliradian divergence angle.

7. The system as specified in claim 1 wherein said transmitting telescope is comprised of a larger first lens and a smaller second lens, wherein the two lenses operate in combination to further collimate the modulated laser beam positioned by said MEMS mirror assembly.

8. The system as specified in claim 7 wherein the divergence angle of the modulated laser beam can be further reduced by selectively altering the ratio of the focal length of the first and second lenses of said transmitting telescope.

9. The system as specified in claim 1 wherein said MEMS mirror assembly has means for reflecting and positioning the collimated laser beam prior to being applied to said transmitting telescope, wherein said MEMS mirror assembly comprises:
  a) a MEMS mirror,
  b) a first pair of permanent magnets that are vertically-aligned with respect to said MEMS mirror,
  c) a second pair of permanent magnets that are horizontally-aligned with respect to said MEMS mirror, and
  d) a pair of electrical coils connected to a power source, wherein the current produced by said coils interacts with the magnetic fields produced by said magnets to allow the MEMS mirror to tilt in two orthogonal axes, wherein each axis has a deflecting angle of ±5 degrees.

10. The system as specified in claim 9 wherein said MEMS mirror is produced on a single silicon crystal.

11. The system as specified in claim 10 wherein said MEMS mirror assembly is capable of a ±5-degree angular movement within a 5-millisecond time period and is designed to compensate for atmospheric and physical disturbances associated with optical communication, wherein said disturbances include building sway, wind, and scintillations caused by changes in the refraction index of the atmosphere.

12. The system as specified in claim 1 wherein said receiving telescope is comprised of a receiving aperture consisting of a single lens and a narrow band filter having a ±20 NM bandpass per laser wavelength which allows a focused laser beam to pass through.

13. The system as specified in claim 12 further comprising a quad sensor that is evenly spaced around the receiving aperture of said receiving telescope.

14. The system as specified in claim 13 wherein each said quad sensor is comprised of an averaging lens, a narrow band filter, a photodiode and an amplifier, wherein when the incoming modulated laser beam from said transmitting telescope arrives at the receiving aperture, the quad sensor output detects the x-y coordinates of the incoming modulated laser beam, and produces a signal that is applied to said microcontroller, from where said MEMS mirror assembly is activated to guide the modulated laser beam to the center of the receiving aperture.

15. The system as specified in claim 14 wherein said quad sensor is operated by means of a quad sensor processing algorithm.

16. The system as specified in claim 1 wherein said narrow band filter is comprised of a narrow bandpass filter, wherein said filter is designed to specifically filter light produced by solar phenomenon, sky irradiance and other sources.

17. The system as specified in claim 1 wherein said receiving and transmitting optical unit further comprises a display subsystem that is operated by said microcontroller, wherein said display is designed to display incoming and outgoing data.

18. The system as specified in claim 1 wherein said transmitting telescope and said receiving telescope are integrated into a dual composite telescope system capable of both transmitting and receiving data signals.

19. The system as specified in claim 1 wherein the beam diameter arriving at the receiving aperture of said receiving telescope can be set to be slightly larger than the diameter of the aperture by adjusting the lenses on said collimator and said transmitting telescope to aid detection of disturbances associated with optical communication.

* * * * *